US007032133B1

(12) United States Patent
Lang et al.

(10) Patent No.: US 7,032,133 B1
(45) Date of Patent: Apr. 18, 2006

(54) METHOD AND SYSTEM FOR TESTING A COMPUTING ARRANGEMENT

(75) Inventors: Michelle J. Lang, Minneapolis, MN (US); William Judge Yohn, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 604 days.

(21) Appl. No.: 10/164,877

(22) Filed: Jun. 6, 2002

(51) Int. Cl.
*G06F 11/00* (2006.01)

(52) U.S. Cl. .......................................... 714/33; 714/32
(58) Field of Classification Search ................. 714/33, 714/32, 46, 47
See application file for complete search history.

(56) References Cited

U.S. PATENT DOCUMENTS

| | | | | |
|---|---|---|---|---|
| 5,740,353 A | * | 4/1998 | Kreulen et al. ............... 714/42 |
| 5,956,478 A | * | 9/1999 | Huggins ...................... 714/33 |
| 6,415,396 B1 | * | 7/2002 | Singh et al. .................. 714/38 |
| 6,560,721 B1 | * | 5/2003 | Boardman et al. ............ 714/33 |
| 6,625,760 B1 | * | 9/2003 | Man et al. .................... 714/33 |
| 6,678,841 B1 | * | 1/2004 | Kurosawa et al. ............ 714/57 |
| 6,766,473 B1 | * | 7/2004 | Nozuyama ................... 714/33 |
| 6,795,790 B1 | * | 9/2004 | Lang et al. .................. 702/123 |
| 6,829,731 B1 | * | 12/2004 | LaFauci et al. ............... 714/33 |
| 2003/0208744 A1 | * | 11/2003 | Amir et al. .................. 717/124 |
| 2004/0078674 A1 | * | 4/2004 | Raimi et al. .................. 714/33 |

\* cited by examiner

*Primary Examiner*—Scott Baderman
*Assistant Examiner*—Joshua Lohn
(74) *Attorney, Agent, or Firm*—Charles A. Johnson; Mark T. Starr; Crawford Maunu PLLC (57) ABSTRACT

A method and apparatus for testing a computing arrangement. In various embodiments, a plurality of parameter definitions are established, including a static-value parameter and a dynamic-value parameter. A plurality of sets of parameter values are established in association with the parameter definitions. A results storage area has portions respectively associated with the sets of parameter values. A test program is associated with the parameter definitions and is configured to execute using one set of parameter values at a time. The test program inputs a parameter value associated with a static parameter, automatically generates a value for each dynamic parameter, and exercises the computing arrangement using the parameter values in a set, the value of each parameter affecting behavior of the computing arrangement via the test program. The test program further stores data resulting from execution of the test program in portions of the results storage area respectively associated with the sets of parameter values. In another embodiment, a feedback mechanism adjusts parameter values in the sets to automate the process of constructing suitable sets of values.

27 Claims, 6 Drawing Sheets

METHOD AND SYSTEM FOR TESTING A COMPUTING ARRANGEMENT

FIELD OF THE INVENTION

The present invention generally relates to testing computing arrangements, and more particularly to managing and organizing test scenarios.

BACKGROUND OF THE INVENTION

Exhaustive system-level testing of a complex data processing system is unfeasible because there are too many capabilities to test within a reasonable period of time. Therefore, testing is often focused in areas that are likely to be prone to error or critical areas.

A function test is used to determine whether the system correctly performs the function under test. Function tests are useful for verifying correct behavior of the system when performing various functions of the system. However, complex and unpredictable interactions between system functions are difficult to address with function testing because of the number of different functions to be tested.

To cover system behavior not addressed by testing at the function level, the function-level tests are sometimes randomly combined in hopes of creating conditions that test previously uncovered areas of system behavior. Unfortunately, with large systems, the number of possible random combinations and time required to run each test make running enough tests to cover all desired tests areas unfeasible. Thus, test coverage using random combinations of function tests is unpredictable.

If the system-level testing is weighted too heavily toward function testing, complex and unpredictable interactions between components may go untested. Similarly, if the system-level testing is weighted too heavily toward random tests, testing of some critical functions may be overlooked.

A method and apparatus that addresses the aforementioned problems, as well as other related problems, are therefore desirable.

SUMMARY OF THE INVENTION

In various embodiments, the invention provides a method and apparatus for testing a computing arrangement. In various embodiments, a plurality of parameter definitions are established, including a static-value parameter and a dynamic-value parameter. A plurality of sets of parameter values are established in association with the parameter definitions. A results storage area has portions respectively associated with the sets of parameter values. A test program is associated with the parameter definitions and is configured to execute using one set of parameter values at a time. The test program inputs a parameter value associated with a static parameter, automatically generates a value for each dynamic parameter, and exercises the computing arrangement using the parameter values in a set, the value of each parameter affecting behavior of the computing arrangement via the test program. The test program further stores data resulting from execution of the test program in portions of the results storage area respectively associated with the sets of parameter values. In another embodiment, a feedback mechanism adjusts parameter values in the sets to automate the process of constructing suitable sets of values.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

In various embodiments the present invention provides a mechanism for focusing tests on areas of the system using a combination of fixed, and random parameters. Sets of parameter values and specific test programs are packaged as environments. The packaged environments provide the ability to easily move from testing one area of focus to another. Environments can be modified or used as the basis for creating new environments. New environments can be automatically generated at random, thereby giving the user the ability to create new environments that focus on different areas, or expand or contract individual areas of focus. A feedback mechanism is available to monitor a selected performance indicator of the system while testing within an environment. Based on the value of the performance indicator, selected parameter values in the environment are automatically adjusted in refining the environment.

The invention supports testing of a variety of areas of a complex computing arrangement. For example, assume that the integrity of a global caching system is being tested. Testing of this complex area in its entirety is not feasible using purely random methods. Thus, a test with a desirable level of coverage will focus on those areas of the design considered high-risk or prone to error. If the goal is a load-stress-volume test of the system, stress and boundary conditions must be targeted as well. For example, suppose a high-risk area of the design has been identified, and is related to very high volume of large transfers for cacheable files in the Unisys system for global file caching. In order to focus on this area, the minimum requirements may be marking all target files as "do-cache" and all transfers must fall in the range of 10,000–32,000 words. Other requirements may include such attributes as a minimum number of active threads, and/or use of asynchronous I/O.

Within this focus area of high-volume large transfers for cacheable files, however, it may be no more likely for an error to occur using an I/O transfer size of 10,000 words than it is for the error to occur at a transfer size of 10,001 words, assuming these transfer sizes do not cross any architectural boundaries or internal limits. With knowledge of the system architecture and test design, it is possible to identify entire ranges of words that are indistinguishable in the ability to detect an error within some focus area. Thus, a transfer size could be selected at random within such a range with relatively low risk of missing an error.

Because parameters sometimes have unforeseen interactions or affects on the behavior of the system, it may be desirable to dynamically adjust parameter values during test execution. Continuing with the previous example, a transfer size of 1792*8 words has architectural significance because transfers that are greater than this size will bypass the cache. In most circumstances, analysis of the design would have identified this fact, and transfers on either side of this boundary would be contained in a focus area. However, boundaries and interactions are not always easily identified. By incorporating test code that not only selects parameter values at random within allowable ranges, but also dynamically alters these values during execution, the probability increases for detecting unpredictable and complex combinatorial failures within the focus area. In an example embodiment, conventional pseudo-random number generation techniques are used to generate a value for a random parameter.

Figure 1A:
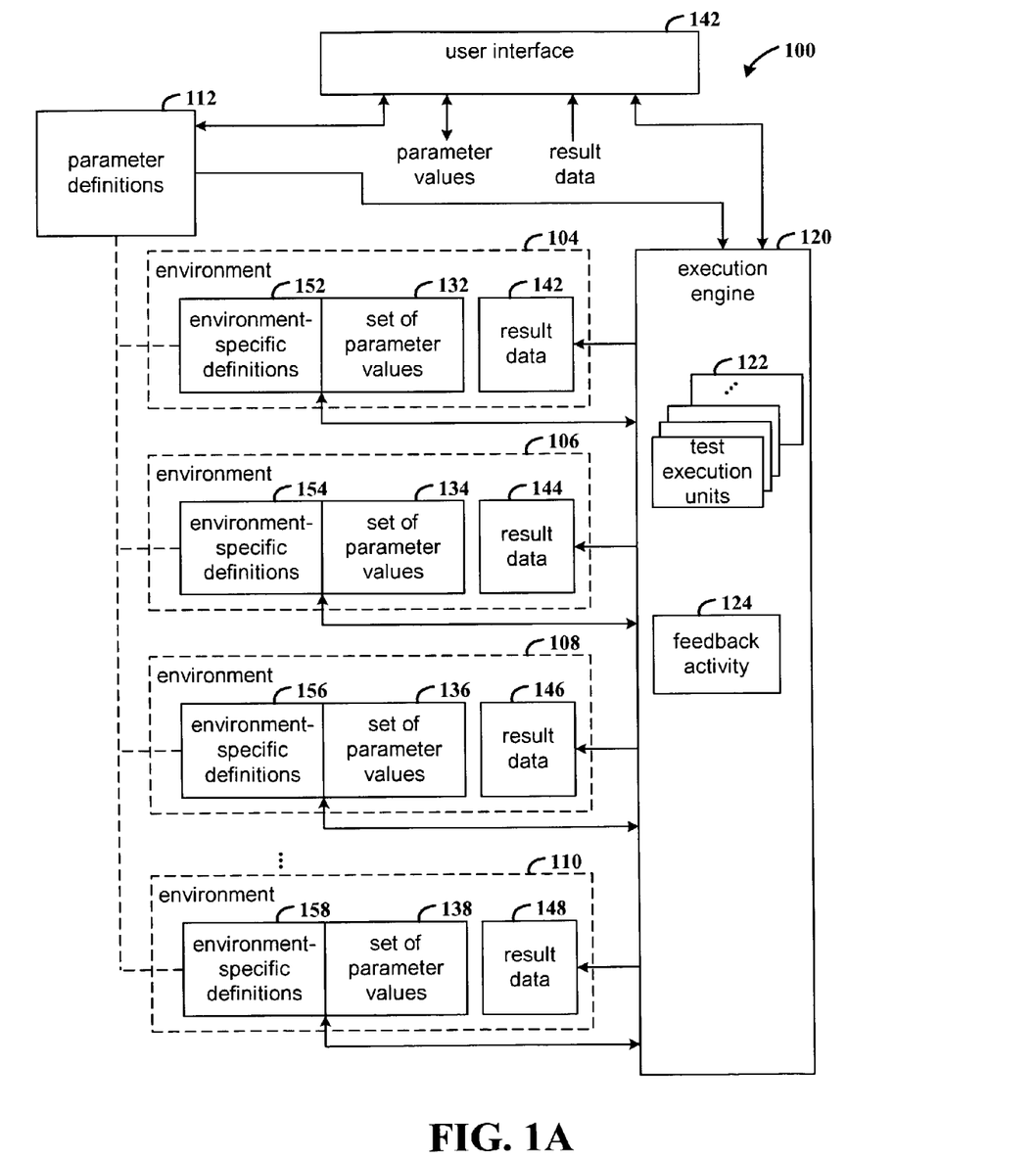
FIG. 1A is a functional block diagram of a system for testing a computing arrangement.

FIG. 1A is a functional block diagram of a system 100 for testing a computing arrangement in accordance with one embodiment of the invention. Once the major functional areas to be tested have been identified, environments and test programs can be created to test the functional areas. The environments include values of the parameters that are used and result data that are gathered during test execution.

The particular major functional areas to be tested depend on the computing arrangement. For example, in a computing arrangement configured with 2200 series data processing system hardware and software from Unisys, the major functional areas include, for example, the global file cache, I/O Complex, and cache/memory complex. It will be appreciated that different computing arrangements will have different major functional areas to be tested.

Within each major functional area, different focus areas are identified for testing. Each focus area is defined in terms of an environment, for example environments 104, 106, 108, and 110. Focus areas for testing a functional area such as a global cache, include high volume input/output (I/O), data integrity, multiply assigned files, cache-bypass processing, data caching, word-addressable files, large transfers, shared files, and multiply assigned files.

Within the functional area, all parameters are identified that affect the system behavior relative to the focus areas, and the parameters are stored as parameter definitions 112. In one embodiment, only parameters that are capable of being controlled by the end-user are included. For a volume I/O test, an example subset of the parameters includes transfer size, I/O type (asynchronous/synchronous), ratio of reads to writes, devices selected, files per device, file caching state, and file size. The parameters may also include parameters that are more abstract, for example, data verification type, execution algorithm, file optimization scheme, I/O distribution algorithm, thread distribution algorithms, buffer allocation scheme, average transfer rate, maximum concurrent I/Os, and level of overlapping.

Once the parameters have been identified, program code is developed to perform a test that acts on and adjusts execution based on values of the parameters. In one embodiment the test code is implemented with an execution engine 120 that controls the execution of one or more test execution units 122 and a feedback activity 124. The test execution units adjust parameter values during execution, depending on the parameter types, and perform tests using the parameter values. It will be appreciated that the particular nature of the test depends on the arrangement under test, the functional area being tested, and the focus area. The test code is packaged together with the environments in a single executable unit. Once an environment has been created and selected, execution of the test code can begin. The test code will execute with all parameter values as designated by the active environment.

Areas of focus are identified and environments are defined once the parameters have been identified and the test code created. Example focus areas for testing a global cache include very large transfers involving disk storage, very large transfers involving cacheable files, small transfers and maximum concurrency, fragmented and multiply assigned files, high-volume read traffic with large transfers, maximum write traffic and many other environments.

An environment includes parameter values and ranges of values that are adhered to during execution of the environment. Test execution within an environment continues for a prescribed period of time. When test execution within an environment is complete, the execution engine 120 moves to the next environment. Environments are executed in the order they are defined. The present invention supports management of a large number of distinct environments from environment creation through test execution.

Sub-environments are supported in another embodiment of the invention. A sub-environment inherits selected parameter values from another environment, which is referred to as the parent environment. Sub-environments of a parent environment are run immediately after the parent environment and are executed in the order in which the sub-environments are created. Sub-environments can be used to create different variations on a basic parent environment that is generally suited for a focus area. Sub-environments can also be used to create complex sequences where the state of one sub-environment builds on a previous sub-environment.

Figure 1B:
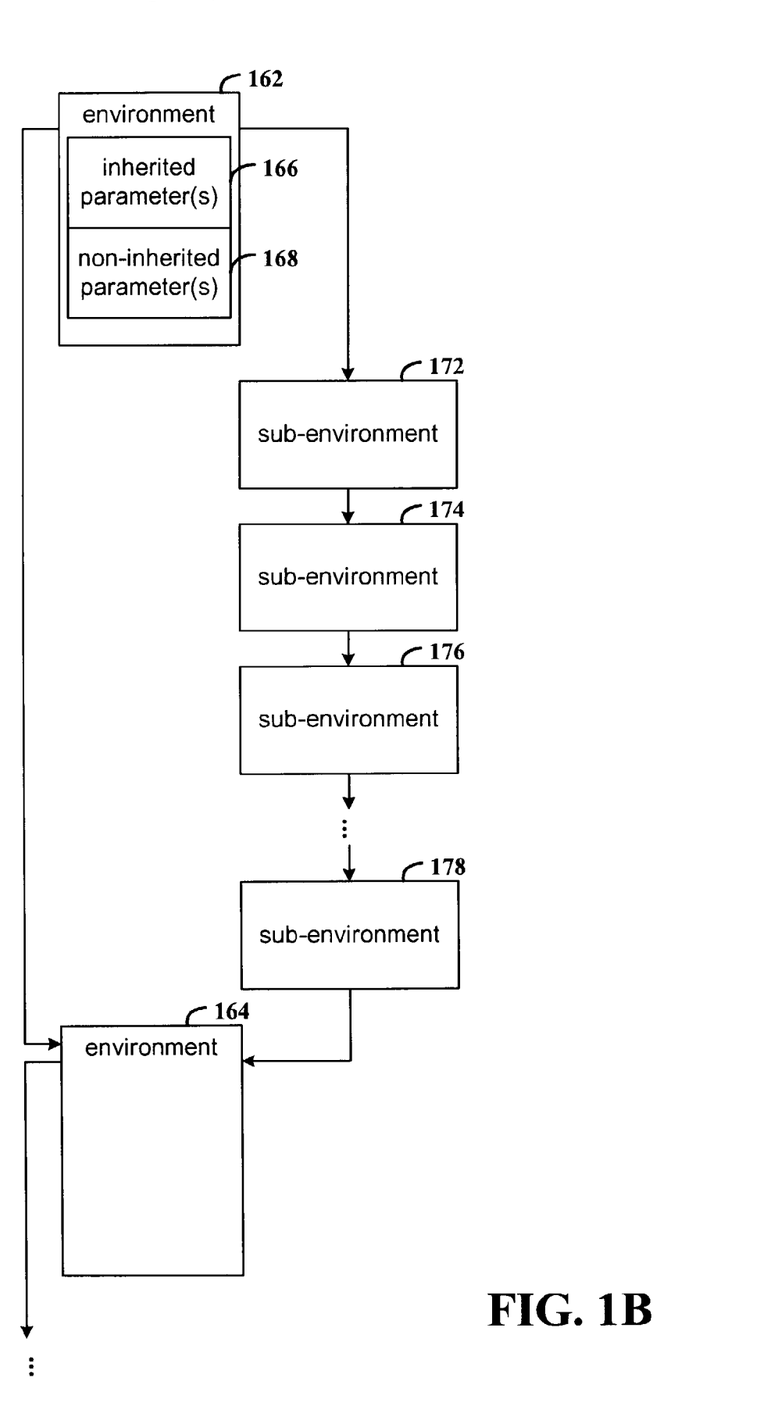
FIG. 1B is a block diagram that illustrates the relationships between environments and sub-environments.

FIG. 1B is a block diagram that illustrates the relationships between environments and sub-environments. In one embodiment, the environments are linked by pointers. For example, environment 162 is linked to the next-defined environment 164. An environment includes inherited parameters 166, which are those that are inherited by sub-environments, and non-inherited parameters 168, which are those not inherited by sub-environments. Sub-environments 172, 174, 176, and 178 are sub-environments of parent environment 162. Thus, the sub-environments inherit values of parameters in the set of inherited parameters 166, but not the values of parameters in the set of non-inherited parameters. Execution begins with environment 162 and continues sequentially with sub-environments 172, 174, 176, and 178. Environment 164 is executed after execution of sub-environment 178 is complete.

An example scenario in which a sub-environment is used is where the sub-environment inherits the assignment of files from the parent environment. The parent environment issues large I/O-write transfers to each of its target files, after first marking the files "do-not-cache." When the parent environment completes execution, the files have been newly updated, and the most recent updates are located on disk. The sub-environment begins execution, changes the caching mode on the files back to "do-cache," and begins to read the data in large one track I/Os. Each read requires that the data be allocated and moved back into cache.

To facilitate automatic transitions between environments, each environment may be specified with a setup routine, a termination routine, or background routine(s), and various combinations thereof. The setup routine is executed just prior to executing an environment. An example setup routine changes the mode of each target file to do-not-cache under program control. A termination routine, on the other hand, is executed immediately after an environment is executed. Example functions of a termination routine include freeing and reassigning files. A background routine is executed as a separate activity, and remains active during the entire duration of an environment. A background routine might be created to continuously change the caching mode on a file back and forth between do-cache and do-not-cache, or to provide background memory traffic.

If environments are run under control of a single executing program, such as execution engine 120, passing of information between sub-environments is straightforward. The entire user address space, and hence all previously created data structures are accessible during execution of a subsequent environment. For example, a file descriptor table built in memory during execution of the first environment is available to subsequent sub-environments because the executing thread is the same and has access to the same memory. Time savings are realized from not having to re-allocate inherited resources.

Sub-environments are also useful in cases where a parameter is thought to have a significant, but unpredictable effect on the overall behavior of the system, within that focus area. For example, suppose the distribution of I/O transfers across devices is thought to significantly affect the ability to sustain maximum I/O throughput. However, the type of distribution having the greatest effect, or what the behavior of the system will be as this varies, is unknown. Multiple sub-environments could be created for one environment, with each sub-environment varying only this single parameter.

In order to achieve the test objective of a focus area, parameters are set to appropriate values in an environment. Each environment (104, 106, 108, and 110) has an associated set of parameter values (132, 134, 136, and 138). For example, an environment that concentrates on large transfers may specify that transfer sizes remain in the range of 10,000–65,000 words. If the environment also requires very high volume, it may be necessary to limit data verification, or increase the number of active threads.

Not only are parameter values set for an environment, but the parameters in an environment can be specified as having a fixed value, restricted to a particular range, or allowed to vary randomly during execution of the environment. Depending on how general, or how specific the environment is, a greater or lesser number of parameters may need to be restricted to limited ranges or specific values. Parameters with fixed values or restricted ranges are typically those parameters that have a significant influence on the ability of the test to remain within the focus area.

Some parameters, on the other hand, may have only a limited effect on the ability to keep the execution within the focus of the specified environment. For example, it is likely that the file assign type is not a significant factor for sustaining a high volume of large I/O transfers when the target is a mass storage device. In 2200 systems the assign type indicates whether the file is temporary or catalogued, and whether the file is word addressable or sector addressable. That is, regardless of its assign type, the ability of the environment to maintain a high volume of I/O transfers will not change. Parameters that meet this criteria can be left as "unspecified" and the values will vary randomly during the course of executing the environment.

During execution, the test code uses the specified parameter values. For a parameter value specified as a range of values, values are selected at random from within the range. Whenever it is suitable for a test execution unit 122, the value of the parameter having the specified range is varied dynamically as the environment is executing. Any parameters left unspecified are also assigned random values within the scope of allowable values.

System 100 supports creation of tests in addition to supporting test execution. User interface 142 provides user-level control over defining parameters (112), establishing environments (104, 106, 108, 110) and associated parameter values, and viewing result data (142, 144, 146, and 148) generated or gathered by the test execution units 122. In addition to user-level control, feedback activity 124 automates the process of modifying initial parameter values to create parameter values that satisfy certain test objectives.

When the feedback activity is used to create parameter values for an environment, the parameter values that are associated with a pre-defined environment are treated as initial parameter values, and the feedback activity adjusts parameter values to achieve a desired system-level goal. The information on satisfactory parameter settings is saved as historical result data for use during future test runs.

A system-level goal is used in association with an environment to automatically generate satisfactory parameter values. An example goal relates to the rate at which certain measurable events occur on the system. The goal may be fixed (e.g., 100 I/Os per second, or 1000 page faults per second), or the goal may be to maximize or minimize the occurrence of some event (e.g., maximum page faults, minimum I/O queue size). Specific example system level goals include: maintaining a high page fault rate, sustaining maximum I/O throughput, attaining a 70% second level cache hit rate and many other goals.

Information that describes a system-level goal is associated with an environment if the parameter values of the environment are to evolve by operation of the feedback activity. This information defines the system performance measurement that is used to monitor this goal, and the target value for this environment. The target value may be a fixed value, or flagged to indicate that the measurement should be maximized or minimized (e.g., −1=minimize, +MAX_INTEGER=maximize).

It will be appreciated that in many computing arrangements access to the system performance data is available through standard user accessible API calls. The feedback activity 124 monitors the current value of this performance measurement during the course of the environment and modifies the values of the parameters based on the result of the performance data.

In addition to a system-level goal, an environment will typically have one or more secondary functional-level goals. For example, the system-level goal of an environment might be to maximize I/O rate. However, the environment may require use of only word-addressable files or a particular type of data verification. In this example, it is possible that switching to sector addressable files, or eliminating data verification, would improve the overall I/O rate. However, the environment has a secondary goal of testing the data integrity of word-addressable files under load condition. In this case, these particular parameters (file type and data verification type) must remain fixed, regardless of the effect on the system-level goal. Parameters of this type are called critical parameters.

In order to prevent critical parameters from being adjusted by the feedback activity, a critical-parameter flag is associated with the parameters of the environment. The value of the critical-parameter flag indicates whether the parameter may be modified during execution of this environment. If the critical-parameter flag is set for a fixed value parameter, the parameter value may not be changed. If the critical-parameter flag is set for a restricted-range parameter, the range should remain as specified and should not be expanded or contracted. For an unrestricted (random) parameter, setting this flag would indicate that the parameter must remain random—and that no attempt should be made to restrict its range or identify a specific value.

Each environment includes environment-specific parameter definitions (152, 154, 156, 158) that indicate which parameters are critical, fixed, restricted to a range, or allowed to vary at random. Prior to beginning the execution of an environment, the user updates the environment-specific parameter definitions to indicate which parameters are considered critical for that environment, which parameters are fixed, which parameters have a restricted range, and which parameters are allowed to vary randomly. This information is used by the feedback activity when making decisions as to what parameter(s) and what modification(s) should be made next.

Prior to attempting any parameter changes, the feedback activity measures the system performance of the environment using the initial parameter values. These measurements form the baseline measurement for the environment. Subsequent adjustments to the parameter values will result in positive or negative changes relative to this baseline measurement. In an example embodiment, positive changes represent changes that result in measurements closer the system level goal of the environment, and negative changes represent changes that result in measurements further from the desired goal. The opposite may be true in an alternative embodiment.

To accommodate evolving parameter values via the feedback activity, results data (142, 144, 146, 148) include associated parameter values for a baseline measurement, current measurement, best measurement during this session ("best-in-session measurement"), respective best measurements for different types of arrangements (e.g., different hardware platform), and best measurement for all computing arrangements (e.g., all hardware platforms).

The baseline measurement reflects the system behavior when using the initial set of parameter values. The current measurement reflects the behavior of the system at the time of the most recent measurement. The best measurement reflects the measurement that, up until the current time, has come closest to the desired goal. Ideally, as execution proceeds, the overall trend will be to get closer to the defined goal. However, it is not unexpected that temporary deviations from the goal may occur.

The best-in-session measurement and the arrangement-best measurements represent historical data. When, during a session, a combination of parameter values is found that is better than any other set found during that session, the parameter values and measurements are saved as result data. As between executing an environment on different computing arrangements, data are organized by arrangement and further categorized by machine type within an arrangement. In one embodiment, multiple sets of parameter values are saved for each arrangement and/or machine type. These multiple sets of parameter values are those sets of values that produced a selected number of best measurements.

Figure 2:
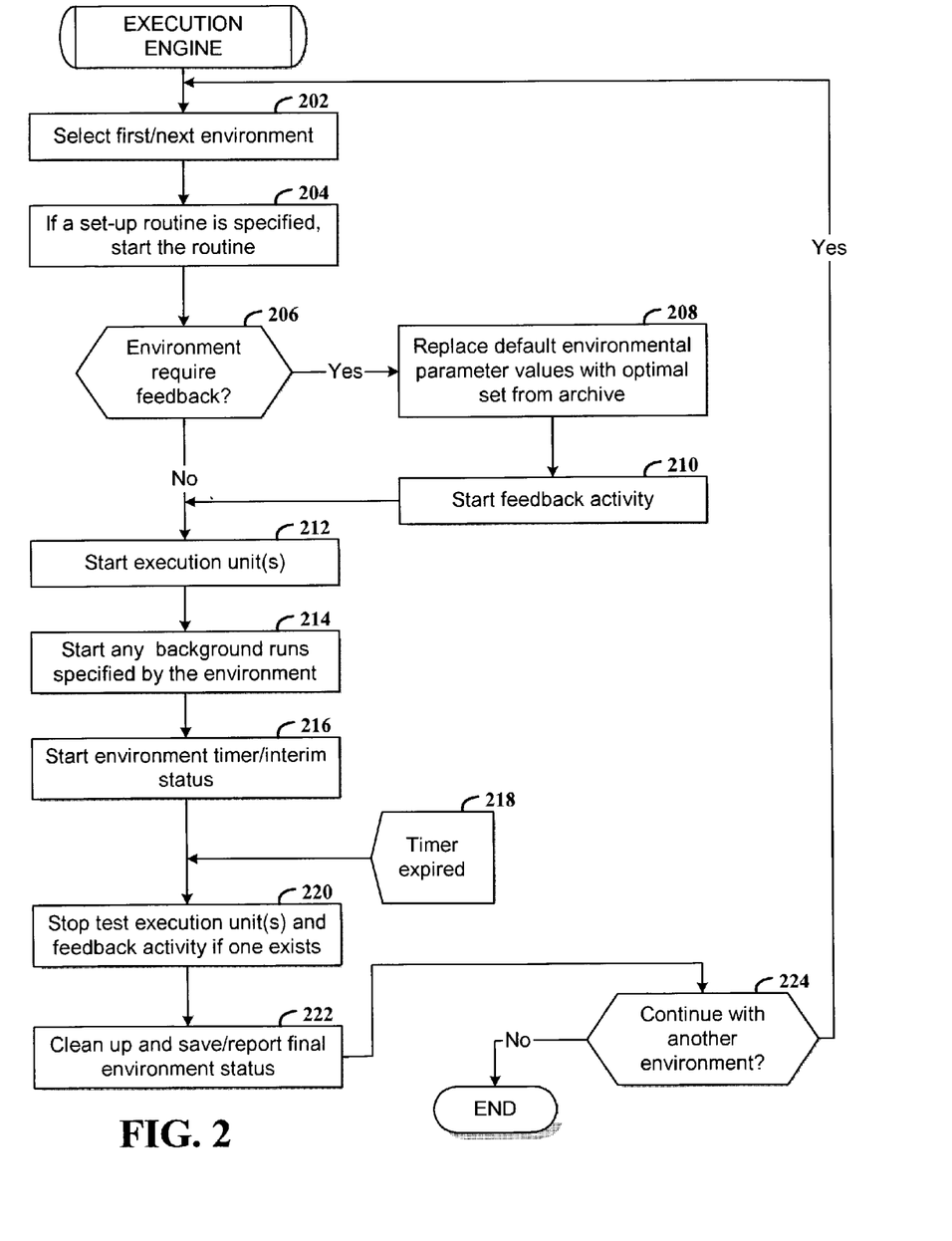
FIG. 2 is a flowchart of a process performed by an execution engine in controlling tests defined in different environments.

FIG. 2 is a flowchart of a process performed by the execution engine in controlling tests defined in different environments. The execution engine 120 is initiated by a user via user interface 142, for example, and commences execution with one of the defined environments (104, 106, 108, 110). The particular environment that is selected for execution (step 202) may be either specified at the time that testing commences or may be pre-configured as a default environment. If the selected environment has an associated set-up routine specified, the routine is started (step 204) before further operations are performed using the environment.

If the environment-specific parameter definitions indicate that the parameter values are to evolve via feedback (step 206), the process proceeds to select an initial set of parameter values (step 208). The initial parameter values may be either default values as established by the user or a best set of values saved from previous executions of the environment. The feedback activity is then started (step 210) before starting the one or more execution units that perform the tests (step 212).

An environment may also include background runs that are to execute while the environment is executing. Example functions of background runs include dynamically changing the caching mode of the global file cache and changing the load on the system. Once the background runs are started (step 214), the execution engine starts an environment timer (step 216) that limits the duration for which the environment is executed. The interim status provides information on accumulated errors up to this point during the execution.

When the timer expires (step 218), the execution engine stops the test execution units and the feedback activity if one was started (step 220). Before continuing with another environment or stopping, the execution engine performs any necessary "housekeeping" operations and saves the final parameter values and test result data (step 222). Example housekeeping tasks include deleting files before changing environments, terminating activities, and freeing dynamically acquired memory. If there are additional environments or sub-environments to execute and the user does not choose to stop testing (decision step 224), the execution engine selects another environment to test (step 202). Otherwise, the execution engine is finished.

Figure 3:
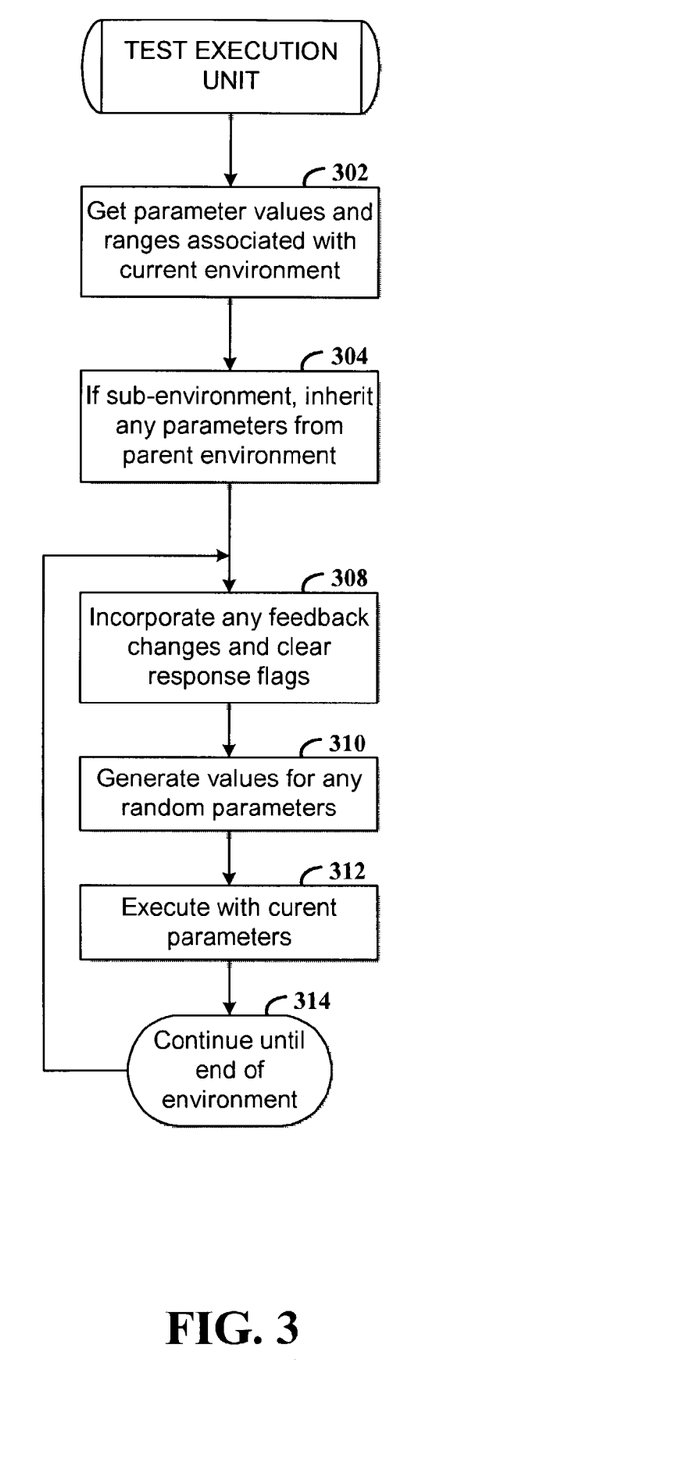
FIG. 3 is a flowchart of a general process performed by a test execution unit.

FIG. 3 is a flowchart of a general process performed by a test execution unit in accordance with one embodiment of the invention. A test execution unit obtains parameter values specified for the environment (step 302). If a sub-environment is being executed, any designated parameter values are inherited from the parent environment (step 304). Depending on test requirements, the initial set of parameter values may be either user-defined or selected from a saved sets of parameter values. As explained above, multiple sets of parameter values can be saved for each type of computing arrangement under test. If a set of optimal parameter values is being developed over multiple executions of the environment and n of the most recent sets of parameter values are saved, then the most recently used/optimized parameter set is selected, assuming that the most recent parameter set is the most optimal.

There may be circumstances, however, where the most recently optimized set of parameters is not desired. For example, user may not wish to start with a set of parameter values that resulted in a system stop. In other cases, the selected set of parameter values may represent an unexpected deviation from normal operation of the system. In observing that initial baseline measurements for the parameter values differ significantly from the recorded measurement, the user may elect to begin with a different set of parameter values.

While the test execution unit is executing, parameter value changes indicated by the feedback activity 124 are incorporated by the test execution unit (step 308). If multiple test execution units are executing, each test execution unit waits for the others to incorporate parameter value changes before proceeding. In one embodiment, this is accomplished by way of response flags.

In order to determine when all test execution units have responded to a change in parameter values, each environment has an associated set of response flags. There is one set of flags for each modified parameter value. Each set of flags contains one flag per test execution unit. If the feedback routine is restricted to changing only one parameter at a time, one set of response flags is required. A flag that is set indicates to an execution unit that a parameter value with which it is operating needs to be adjusted. Once the parameter value has been incorporated, the execution unit clears the flag—indicating to the feedback thread that it has successfully incorporated the change and adjusted its execution.

As test execution units proceed, periodic access to the environmental parameter values is required. A change flag indicates whether the value of an associated parameter has been recently adjusted. A corresponding response index determines which set of response flags is to be used when responding to this parameter. A special set of "zero" flags is used for response index zero. Clearing an index to zero, points a parameter to this set of flags—indicating that no response is needed.

In order to eliminate the requirement for locking, test execution units follow a prescribed order when updating and accessing flags. The parameter change flag is checked first. If the change flag is not set, the test execution unit reads the value of the parameter and continues execution. If the parameter change flag is set, the test execution unit uses the flag index to locate the associated response flags for that parameter. If the response flag is set, the test execution unit is required to clear the flag after responding to the parameter. Once the response flag state has been noted, the test execution unit can read the (new) value of the parameter.

The feedback activity, on the other hand, uses the following sequence when accessing and updating flags. The parameter value is always updated first, before updating any flags or indexes. After updating the parameter value, the response flags are set and the index is adjusted to point to these flags. Only after performing these actions is the parameter change flag set.

Note that this sequence does not preclude the possibility that a test execution unit will read a new value for a parameter without realizing that the value has been changed, because the feedback activity updates the parameter before setting the change flag. However, it does eliminate the possibility of clearing a response flag in error. Once the change flag has been set, the next access to the parameter will result in the test execution unit acknowledging the change.

After incorporating any changes from the feedback activity, the test execution unit generates values for any random parameters, including values in restricted ranges, in the environment (step 310). Any of a variety of known random number generator algorithms can be used. The test execution then continues execution with the new parameter values (step 312). It will be appreciated that the test execution includes saving data resulting from execution of the test code as results data (e.g., 142, 144, 146, or 148) of the current environment (e.g., 104, 106, 108, or 110).

FIG. 4A is a flowchart of a process performed by the feedback activity. Once the initial parameter set has been identified, and the baseline measurements have been taken, the feedback activity can begin to make adjustments. Changes to parameter values are written directly into the environment in user program level memory, giving each test execution unit of the program immediate access to these changes. The point at which these changes are incorporated in the executing environment is determined by the speed with which the executing code can both recognize and respond to the changes. Any further parameter changes, or attempts to measure current system state, must be deferred until such time as all test execution units have incorporated the adjustments into their execution.

When choosing which parameter values to adjust, the feedback activity routine follows these general rules: 1) values of critical parameters are not changed; 2) the type of the parameter (fixed, restricted, unrestricted) is maintained wherever possible; 3) random parameters are not changed to another type (except under special conditions); 4) changes are made in progressive increments, attempting to remain as close to the original focus area as possible; 5) values of parameters that are more easily acted on by the test execution unit(s) are changed first; and 6) parameter values are selected with the intent of getting closer to the system level goal.

The parameter definitions further include information that indicates levels of difficulty ("difficulty levels") associated with changing the parameter type and the parameter value relative to incorporation by a test execution unit. This information is used to assess how difficult, how quickly, and at what level a parameter can be adjusted during execution. For example, in 2200 systems, assigning files and creating new processes involve different levels of system overhead. Thus, parameters associated with assigning files will have a different difficulty level than parameters associated with creating new processes. The difficulty levels are assigned by a user.

The number of difficulty levels that are defined and the criteria used for assigning parameters to these levels are implementation dependent. In one embodiment, parameters at the highest difficulty level require significant time and/or overhead to change. For example, changes to a parameter having a high difficulty level may require that execution be temporarily halted or require that changes be made only by the test execution engine, and only at specific times during execution.

Parameters having the lowest difficulty levels, on the other hand, require no special setup. These parameters can be adjusted at any time, and are frequently reread in the main-path of a test execution unit. Generally, parameters having higher difficulty levels are adjusted less frequently than parameters having lower difficulty levels.

In one embodiment, the difficulty levels are divided into two measures. One measure relates to the difficulty involved in reducing the current value of the parameter. The other relates to the difficulty involved in increasing the current value of the parameter. For example, marking a file invalid in a file table for the parameter of the number of target files requires relatively low overhead. However, assigning a new file requires significantly more overhead and can only be accomplished at relatively infrequent intervals during test execution for parameters such as the number of files/device or total number of files.

The parameter type indicates whether the parameter is a fixed value parameter, a restricted range parameter, or a random parameter. The type is not intrinsic to the parameter, but is determined by initial environment settings. For example, one environment may require that only two test execution units (a fixed value) be created, and another environment may allow up to ten test execution units (restricted range).

Prior to beginning execution of an environment, the parameter type information is transferred to the environment-specific definition (e.g., 152, 154, 156, 158). This type information is updated each time a new environment begins. The feedback activity attempts to maintain the parameter type during the course of execution. Fixed parameters remain fixed, restricted range parameters remain restricted range, and random parameters remain random whenever possible.

In addition to the parameter types of fixed, random, and restricted range, parameters can be further subdivided according to the type and number of allowable values. Parameter types refer to the current or assigned parameter values whereas value types refer to the allowable values and methodology for a parameter's modification. In the example embodiment, each parameter can be assigned a value type of discrete range, continuous range, or limited choice. Discrete range parameters are characterized by a relatively small number of possible values. Typically, a discrete range parameter would have less than a hundred possible discrete values. When adjusting discrete range parameters, changes are made incrementally and follow the path of positive change, should one exist. This is based on an initial assumption that the parameter has a linear, exponential, or otherwise continuously increasing, relationship to system behavior. During later optimization stages, when optimization along these lines is no longer possible, deviations from this incremental approach will be allowed.

Continuous range parameters, although not necessarily mathematically continuous, have a sufficiently large number of possible values that attempting them all is not possible. In addition minor variations typically have little effect. For example, in adjusting the word count in data transfers the range of allowable values is quite large and variations in system behavior when adjusting the value by only a few words is not expected to be significant. When adjusting parameters of this type, a variant of the divide-and-conquer approach is used. The initial value is used to logically divide the range into two portions, and a measurement from each portion is taken. The best measurement becomes the basis for subdividing the portion in which it belongs into two new portions. The process of subdividing the range is repeated until no further progress is made, or the range has reached some minimum size. An example of this type of parameter is I/O transfer-size.

Limited choice parameters have a fixed, small number of choices, for example, not more than four or five different values. In addition each different value has unknown effects on the system. For example, finding that an improvement occurred when changing from a first algorithm to a second algorithm allows no prediction as to the effect of changing from the second algorithm to a third algorithm. When selecting values for parameters of this type, each value is selected in turn. Selections can be made in any order. An example limited choice parameter is a workload distribution algorithm.

The goal of the feedback activity routine is to find the parameter values that come closest to achieving the system-level goal of the environment, while remaining within the original focus of the environment. The feedback activity's goal is to find these values in the minimum amount of time. During optimization, the feedback activity concentrates on those parameters that appear to have the largest positive influence (relative to the system-level goal) on the system behavior. Less time is spent adjusting parameters that have been found to have insignificant or negative affects on the outcome. Parameters that require large amount of time or overhead to change are also adjusted less frequently than other more responsive parameters.

Figure 4:
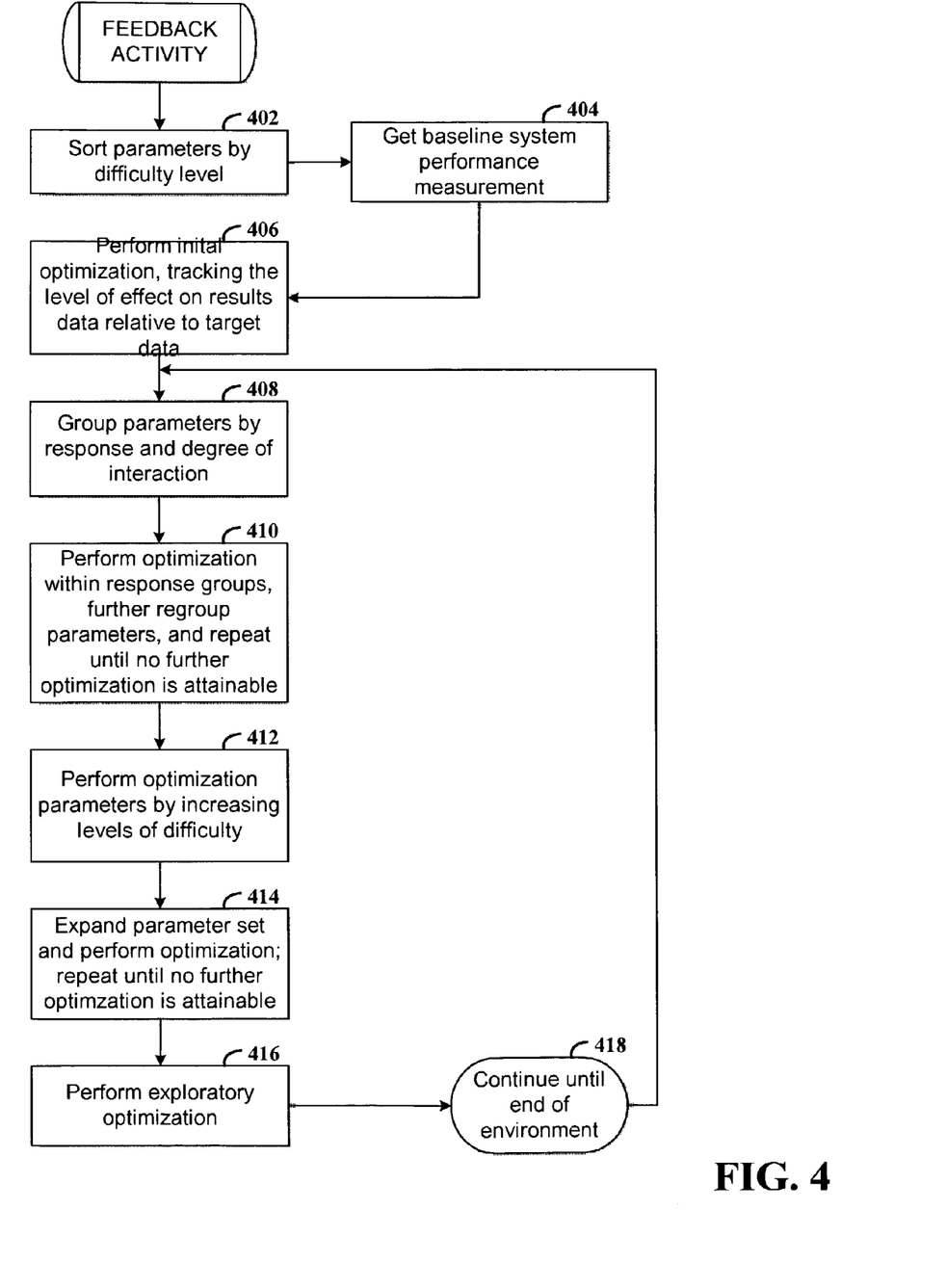
FIG. 4 is a flowchart of a process performed by a feedback activity.

The feedback activity begins by sorting parameters by difficulty level (step 402). Assuming three levels of difficulty, parameters are divided into three groups. Groups may include a combination of fixed value, restricted range, or randomly generated parameters depending on the associated difficulty levels. Critical parameters are not included, as they represent parameters that may not be adjusted.

Random (unrestricted) parameters are established as such because these parameters are expected to have an insignificant effect on the ability of the environment to achieve the associated system-level goal. Thus, random parameters are not optimal candidates for change. However, because interactions of variables cannot always be predicted, some exploration of these parameters is included.

In general, the feedback activity first attempts to optimize the set of parameters at the lowest difficulty level. A set of parameters is considered optimized when changes to any one of the set results in a measurement that is equal to the system-level goal, or as is more likely the case, further from the system-level goal than a previous reading. An individual parameter is considered optimized when both positive and negative changes have an adverse effect on the system measurement. It will be appreciated that the optimization is not absolute, but is dependent on the current values of other environmental parameters.

Once all parameters from the lowest difficulty level have been optimized, a single parameter from the next level of difficulty is selected and the value is adjusted until an optimal value is found. The lowest level parameters are then readjusted until they have been optimized relative to the new parameter value in the next level. This process is repeated until all parameters at the next level have been optimized at least once. Then the parameters at the next level of difficulty are optimized, with re-optimization of parameters at the lower levels with each changed parameter value.

At this stage of optimization, parameters at higher levels of difficulty are optimized individually, and parameters at the lower difficulty level are optimized based on changes at the higher levels. However, the original (higher level difficulty) parameter is not readjusted, or treated as part of this optimization set. This limits the number of changes that are made to higher difficulty level parameters. At some point in optimization there may be a time when no further changes parameter in parameter values can be made that will result in a positive gain. The optimization is then considered stable. At this time, boundaries between difficulty levels are removed, and the parameters are treated as one optimized set. In this way, more interactions between parameters can be explored.

When optimizing a set of parameters, the feedback activity proceeds in several stages. Except for the initial optimization stage, the other stages are repeated. The stages are shown in FIG. 4 and further described in the following paragraphs.

During the initial optimization stage (step 404), each parameter is optimized individually using the initial environment parameter values. The best value for a parameter is found while the current values of all other parameters are fixed. Once all parameters have been optimized once, the process is repeated. Because parameters may interact with each other, a change in one parameter value may mean a new optimal value for another. Recall that when fixed value parameters are adjusted, they are adjusted by assigning another fixed value, ideally a value that results in a measurement closer to the system-level goal. An example of this technique for optimizing a fixed value parameter follows.

Consider the case of a fixed, discrete range parameter with an initial value of 3, and an allowable range of [1, 2, 3, . . . , 10]. The first step in optimizing this parameter is to test the two adjacent values, 2 and 4, for the effects on the system performance measurement, and to record the effects of the change relative to the baseline. The next action depends on whether the change is negative, positive, or there is no change.

For example, if best value is currently 3 and the values 2 and 4 both result in a negative change, this stage of optimization is complete, and another parameter is selected for optimization. The current best parameter value remains 3. Note that it is still possible that this parameter may have a positive effect on the environment at some future time, since changes in other parameters may affect the behavior of this one.

If one of the adjacent values (2 or 4) results in a positive change, and the other results in a negative change, subsequent adjustments to the parameter value selections continue in the direction of the positive change, until such time as no further positive change improvement is observed.

If there is no significant change that results from adjacent values (2 or 4), the next adjacent values are selected (1 or 5). If there is still no change, values at the upper and lower bounds of the range are checked. If there is still no change, the parameter is (temporarily) abandoned, and attention turns to another fixed parameter.

When optimizing limited choice parameters, no direction (in terms of relative values) for improvement is assumed. Each value is selected in turn, and its effect on the system is measured. The value with the best (most positive) effect is the one that is selected. Testing of each value can be terminated prematurely in the event that the value of the parameter appears to have no significant effect on the behavior of the system.

For restricted range parameters, a range is selected instead of a single value. During initial optimization, the size of the range is left unchanged. However, the range is shifted to the right or left (numerically), looking for positive or negative changes in the performance measurement. For a discrete range parameter, the shift is one value to the right (or left). For a continuous range parameter, the shift is a selected percentage of the size of the original range, for example, 50%. As with fixed parameters, the shifts continue in the order of positive change.

After the initial optimization, parameters are grouped by response level and degree of interaction (step 406). As adjustments are made, the feedback activity tracks those parameters that appear to have little affect on the performance measurement, those parameters that cause a negative change, and those parameters that cause a significant positive change. The parameters are then grouped by relative response level and degree of interaction within each difficulty level. Those parameters that cause a positive change are placed in a higher level group within the difficulty level. Parameters that have a strong (positive) interaction with other parameters, in particular, specifically, those that require frequent adjustments on subsequent passes through the parameter list, are also placed in a higher level group. Optimization concentrates on those parameters with the most significant and positive interactions. This reordering and grouping of parameters is dynamic, and may change as new parameters or changes are introduced, and new interactions are found. The number of groups within a difficulty level is implementation specific. At a minimum, three groups would be required, one for parameters with positive responses, one for negative responses, and one for limited response.

Figure 5:
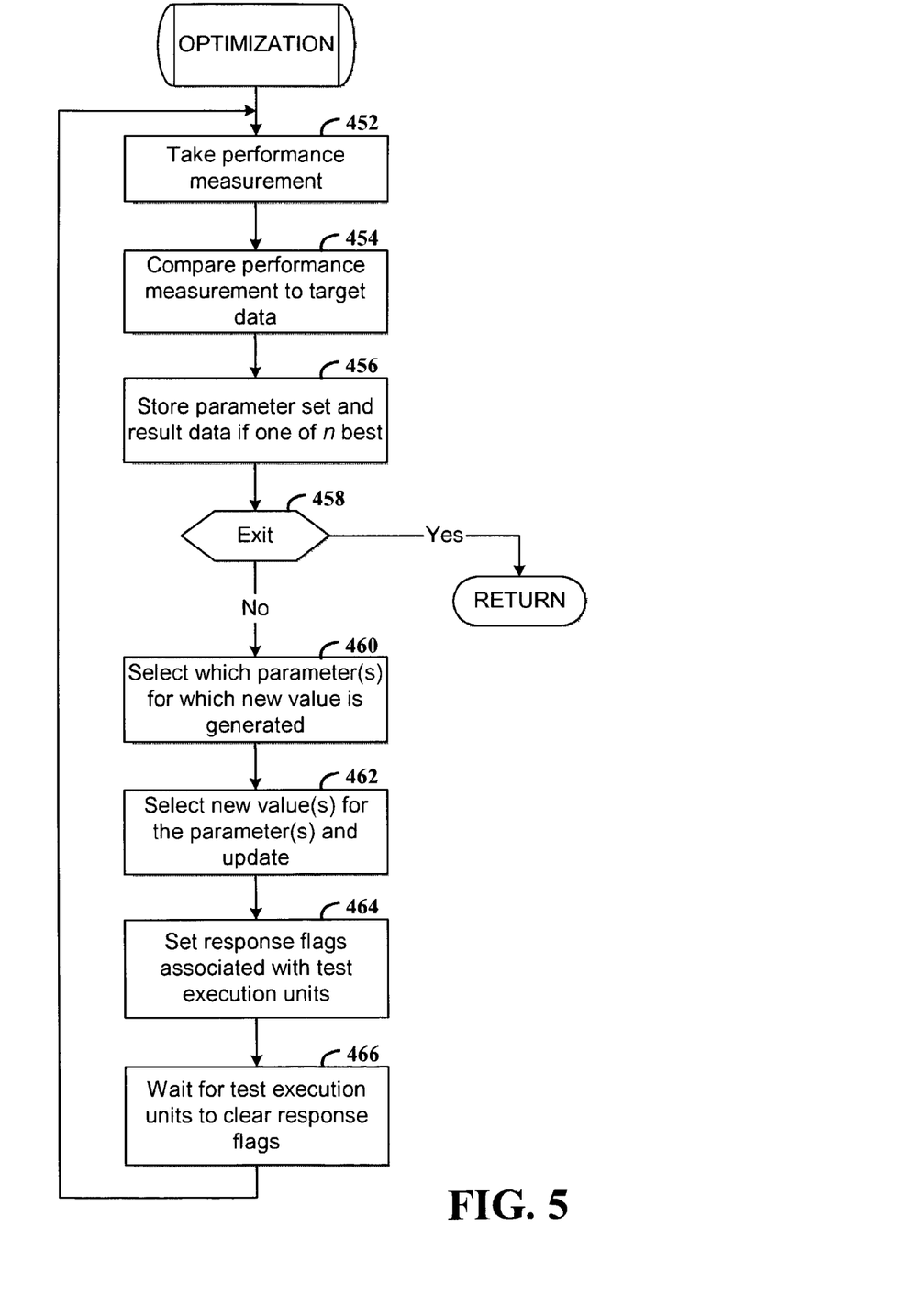
FIG. 5 is a flowchart of a process performed by the feedback activity in optimizing a selected parameter value.

Once the parameters have been grouped, optimization is performed within the response groups (step 408). During the initial optimization stage, several passes through the parameters are made. Information gained with each pass through the parameters is used to separate these parameters into groups according to their level of positive response, and degree of interaction with other parameters. The level of positive response is parameter-specific, relative to the system-level goal, and independent of other parameters. The degree of interaction is a quantitative measurement of how other parameter optimizations are affected by a change in a particular parameter value. Once parameters have been separated into groups, optimization begins to concentrate on those parameters that have been found to exhibit the largest positive results. Parameters in higher-level response groups are optimized more frequently than parameters in lower-level response groups. FIG. 5 illustrates an example process performed for optimization.

If optimization of a response group results in no changes, some steps can be skipped. For example, if optimization of a lower-level response group parameters results in no adjustment from the initial value, no optimization of higher-level response groups is required because there was no change in the lower level response group to affect the higher-level response group. In practice, parameters from the limited or negative interaction sets would infrequently result in changes.

The next stage of optimization optimizes parameters in successive increasing levels of difficulty (step 410). The parameters at each level of difficulty are optimized before continuing with parameters at the next level of difficulty. Based on the current optimized selections, a parameter value is adjusted until an optimal value is found. Again, the process of FIG. 5 is used for optimizing the parameters.

The parameter set is expanded and further optimization is performed after optimizing by increasing levels of difficulty (step 412). Optimization of the expanded parameter set occurs when no further optimization progress can be made by separately optimizing difficult parameters. This stage involves treating all parameters, regardless of their difficulty level as a single parameter set. Parameters are sorted into response groups according to the amount of positive influence and degree of interaction with other parameters in the set. Optimization by group continues as described above, until no further progress can be made.

The final stage of optimization is called the exploratory stage (step 414). During this stage, previously unexplored ranges and parameter values are tested in search of a more optimal solution. Less emphasis is placed on maintaining the same degree of environmental focus, and fewer assumptions are made about the individual functional relationships of parameters.

During the exploratory stage values of random parameters are allowed to vary. In addition, the values for one or more parameters are selected at random, from the set of previously unselected values. This defines a new starting point for the optimization. In "hill-climbing" jargon this constitutes finding a new starting position—one that may allow another (higher) peak to be found. In genetic algorithm jargon, we are allowing genes to mutate. Depending on the overhead associated with changing values of difficult parameters, this stage may be moved ahead of the optimization of expanded parameter set stage.

There may be a higher degree of instability, and slightly longer periods of negative improvement during this stage than in other optimization stages. However, because no further improvement was attainable in the other stages, the exploration of other sets of parameter values is considered desirable. For example, consider the case of a fixed parameter having a discrete range of values of 1–10 and an initial value of 3, and a local maximum at this point. The initial value 3 is the best value attained from previous optimization stages. During the exploratory stage, a value is selected from the previously unselected values: 4–10. Unselected values are those allowable values that have not been considered in prior stages of the optimization. Each parameter value in a range has a flag that is used to indicate when a value is selected. Values are selected, until one is found that results in a positive change, or some maximum number of non-positive changes have been attempted. In this case, testing each of the endpoints, as well as one value in the range 5–10 may be considered sufficient.

The exploratory stage for a restricted range parameter involves first contracting, then expanding the current range. Contracting a restricted parameter range uses a divide-and-conquer method similar to that described above in association with adjusting continuous range parameter values.

The exploratory stage also allows ranges to expand into previously unexplored areas of the range. For restricted range parameters, the original range is abandoned, and a new, larger range is defined. The new range spans the entire range of defined values for the parameter. The divide-and-conquer method is then used to find some subset of this range that produces results closer to the system level goal being measured.

In the case of a random parameter, the first step is implied, as the range of a random parameter is, by definition, the entire range of parameter values.

Without significant additional overhead, it is possible for the feedback activity to monitor the behavior of the system in other (non-goal) areas. For example, if the system level goal of the environment is to maximize the number of write bytes transferred per second, the feedback activity routine could simultaneously measure the average I/O queue size, the total number of requests per second, and the number of split requests. If desired, separate records could be kept for each of these measurements as well. Parameters are adjusted for maximum bytes per second. However, if during the course of this optimization one of the other measurements was found to exceed the previous "best" measurement, the saved set of parameter values could be updated.

This auxiliary information could be used to supply initial starting parameter values for the environment if the user wishes to override the environment goal. For example, the user may want to verify the integrity of word addressable files under conditions of maximum page faults, rather than maximum I/O volume.

FIG. 5 is a flowchart of a process performed by the feedback activity in optimizing a selected parameter value. The optimization process monitors the performance of the system by taking a performance measurement in a selected area of the system (step 452). The performance measurement is compared to a target value for the environment (step 454), and the set of parameter values is stored if the performance measurement is one of n best measurements taken. It will be appreciated that storage of the set of parameter values is made by type of computing arrangement in accordance with one embodiment of the invention.

If the optimization process determines that either performance measurement has reached a desired level or that no further progress is expected (decision step 458), the process returns control to the feedback activity of FIG. 4. Otherwise, one or more parameters are selected for generation of new parameter values (steps 460, 462). The response flags associated with the changed parameter values are set for the test execution units (step 464). When all the test execution units have responded by clearing the respective response flags (step 466), the optimization process returns to take another performance measurement (step 452).

Accordingly, the present invention provides, among other aspects, a method and apparatus for testing data processing systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for testing a computing arrangement, comprising:
   a plurality of parameter definitions, wherein at least one of the parameter definitions specifies a static-value parameter and at least one of the parameter definitions specifies a dynamic-value parameter;
   a plurality of sets of parameter values, wherein each parameter value in a set is a value associated with one of the parameter definitions;
   a target data set associated with at least one of the sets of parameters, the target data set including at least one data value that describes a performance characteristic of the computing arrangement;
   a results storage area having portions respectively associated with the sets of parameter values; and
   a test program associated with the parameter definitions and configured to execute using one set of parameter values at a time, input a parameter value associated with a static parameter, automatically generate a value for each dynamic parameter, and exercise the computing arrangement using the parameter values in a set, wherein the value of each parameter affects behavior of the computing arrangement via the test program, and selectively adjust at least one parameter value in the at least one set of parameter values as a function of data resulting from execution of the test program and a data value from the target data set, and the test program is further configured to store data resulting from execution of the test program in portions of the results storage area respectively associated with the sets of parameter values.

2. The system of claim 1, wherein the test program is further configured to automatically select an untested set of parameter values after completing testing with a current set of parameter values.

3. The system of claim 1, wherein at least one of the parameter definitions specifies a random-value parameter, and the test program is further configured to automatically generate a random value for a random-value parameter.

4. The system of claim 1, wherein at least one of the parameter definitions specifies a restricted-range parameter that defines a range of values, and the test program is further configured to automatically select a value within the range of values of a restricted range parameters.

5. The system of claim 4, wherein the test program is further configured to generate a random value within the range of values of a restricted-range parameter.

6. The system of claim 1, wherein the test program is further configured to execute with each set of parameter values for a selected period of time.

7. The system of claim 1, further comprising:
   a sub-environment definition that is associated with one of the sets of parameter values and that specifies different values for a subset of parameters of the one of the sets of parameter values; and
   wherein the test program is further configured to execute using parameter values of the sub-environment and inherit parameter values from the one of the sets of parameter values for parameters other than the parameter values of the sub-environment.

8. A computer-implemented method for testing a computing arrangement, comprising:
   establishing a plurality of parameter definitions, wherein at least one of the parameter definitions specifies a static-value parameter and at least one of the parameter definitions specifies a dynamic-value parameter;
   establishing a plurality of sets of parameter values, wherein each parameter value in a set is a value associated with one of the parameter definitions;
   establishing at least one target data set in association with at least one of the sets of parameter values, wherein each target data set includes at least one data value that describes a performance characteristic of the computing arrangement;
   associating the sets of parameter values with a test program;
   executing the test program using one set of parameter values at a time, inputting to the test program a parameter value associated with a static parameter, automatically generating a value for each dynamic parameter, and exercising the computing arrangement using the parameter values in a set, wherein the value of each parameter affects behavior of the computing arrangement via the test program;
   selectively adjusting at least one parameter value in the at least one of the sets of parameter values as a function of data resulting from execution of the test program and a data value from the target data set associated with the at least one set of parameters; and
   storing data resulting from execution of the test program in portions of the results storage area respectively associated with the sets of parameter values.

9. The method of claim 8, further comprising automatically selecting an untested set of parameter values after completing testing with a current set of parameter values.

10. The method of claim 8, wherein at least one of the parameter definitions specifies a random-value parameter, and further comprising automatically generating a random value for a random-value parameter.

11. The method of claim 8, wherein at least one of the parameter definitions specifies a restricted-range parameter that defines a range of values, and further comprising automatically selecting a value within the range of values of a restricted range parameters.

12. The method of claim 11, further comprising generating a random value within the range of values of a restricted-range parameter.

13. The method of claim 8, further comprising executing the test program with each set of parameter values for a selected period of time.

14. The method of claim 8, wherein a sub-environment definition is associated with one of the sets of parameter values and specifies different values for a subset of parameters of the one of the sets of parameter values, the method further comprising executing the test program using parameter values of the sub-environment and inheriting parameter values from the one of the sets of parameter values for parameters other than the parameter values of the sub-environment.

15. A system for testing a computing arrangement, comprising:
   a plurality of parameter definitions, wherein at least one of the parameter definitions specifies a static-value parameter and at least one of the parameter definitions specifies a dynamic-value parameter;
   a plurality of sets of parameter values, wherein each parameter value in a set is a value associated with one of the parameter definitions;
   a results storage area having portions respectively associated with the sets of parameter values;
   a plurality of target data sets respectively associated with selected ones of the sets of parameter values, and each target data set includes at least one data value that describes a performance characteristic of the computing arrangement; and
   a test program associated with the parameter definitions and configured to execute using one set of parameter values at a time, input a parameter value associated with a static parameter, automatically generate a value for each dynamic parameter, and exercise the computing arrangement using the parameter values in a set, wherein the value of each parameter affects behavior of the computing arrangement via the test program, and the test program is further configured to store data resulting from execution of the test program in portions of the results storage area respectively associated with the sets of parameter values, and for each set of parameter values having an associated target data set, selectively adjust at least one parameter values in the set of parameter values as a function of data resulting from execution of the test program and a data value from the associated target data set, continue to exercise the computing arrangement using the set of parameter values and adjust the at least one parameter value until data resulting from execution of the test program meets selected criteria relative to a data value from the associated target data set, and save the set of parameter values when data resulting from execution of the test program meets the selected criteria.

16. The system of claim 15, wherein at least one of the parameters is designated as a critical parameter in at least one of the sets of parameter values that has an associated target data set, and the test program is further configured to leave unchanged a critical parameter during program execution.

17. The system of claim 15, wherein the test program is further configured to select an initial value for a random-value parameter and thereafter leave unchanged value of the random-value parameter if the random-value parameter is in a set of parameter values that has an associated target data set.

18. The system of claim 15, wherein the test program is further configured to store in association with each set of parameter values having an associated target data set, multiple sets of parameter values adjusted during execution of the test program.

19. A computer-implemented method for testing a computing arrangement, comprising:
   establishing a plurality of parameter definitions, wherein at least one of the parameter definitions specifies a static-value parameter and at least one of the parameter definitions specifies a dynamic-value parameter;
   establishing a plurality of sets of parameter values, wherein each parameter value in a set is a value associated with one of the parameter definitions;
   establishing a plurality of target data sets, wherein each target data set is respectively associated with one of the sets of parameter values, and each target data set includes at least one data value that describes a performance characteristic of the computing arrangement;

associating the sets of parameter values with a test program;

executing the test program using one set of parameter values at a time, inputting to the test program a parameter value associated with a static parameter, automatically generating a value for each dynamic parameter, and exercising the computing arrangement using the parameter values in a set, wherein the value of each parameter affects behavior of the computing arrangement via the test program;

storing data resulting from execution of the test program in portions of the results storage area respectively associated with the sets of parameter values; and selectively adjusting, for each set of parameter values having an associated target data set, at least one parameter value in the set of parameter values as a function of data resulting from execution of the test program and a data value from the associated target data set, continuing exercising the computing arrangement using the set of parameter values and adjusting the at least one parameter value until data resulting from execution of the test program meets selected criteria relative to a data value from the associated target data set, and saving the set of parameter values when data resulting from execution of the test program meets selected the selected criteria.

20. The method of claim 19, further comprising automatically selecting an untested set of parameter values after completing testing with a current set of parameter values.

21. The method of claim 19, wherein at least one of the parameter definitions specifies a random-value parameter, and further comprising automatically generating a random value for a random-value parameter.

22. The method of claim 19, wherein at least one of the parameter definitions specifies a restricted-range parameter that defines a range of values, and further comprising automatically selecting a value within the range of values of a restricted range parameters.

23. The method of claim 22, further comprising generating a random value within the range of values of a restricted-range parameter.

24. The method of claim 19, further comprising executing the test program with each set of parameter values for a selected period of time.

25. The method of claim 19, wherein a sub-environment definition is associated with one of the sets of parameter values and specifies different values for a subset of parameters of the one of the sets of parameter values, the method further comprising executing the test program using parameter values of the sub-environment and inheriting parameter values from the one of the sets of parameter values for parameters other than the parameter values of the sub-environment.

26. An apparatus for testing a computing arrangement, comprising:

means for establishing a plurality of parameter definitions, wherein at least one of the parameter definitions specifies a static-value parameter and at least one of the parameter definitions specifies a dynamic-value parameter;

means for establishing a plurality of sets of parameter values, wherein each parameter value in a set is a value associated with one of the parameter definitions;

means for associating the sets of parameter values with a test program;

means for establishing at least one target data set in association with at least one of the sets of parameter values, wherein each target data set includes at least one data value that describes a performance characteristic of the computing arrangement;

means for executing the test program using one set of parameter values at a time, inputting to the test program a parameter value associated with a static parameter, automatically generating a value for each dynamic parameter, and exercising the computing arrangement using the parameter values in a set, wherein the value of each parameter affects behavior of the computing arrangement via the test program;

means for selectively adjusting a parameter value in at least one of the sets of parameter values as a function of data resulting from execution of the test program and a data value from the target data set associated with the at least one set of parameters; and means for storing data resulting from execution of the test program in portions of the results storage area respectively associated with the sets of parameter values.

27. An apparatus for testing a computing arrangement, comprising:

means for establishing a plurality of parameter definitions, wherein at least one of the parameter definitions specifies a static-value parameter and at least one of the parameter definitions specifies a dynamic-value parameter;

means for establishing a plurality of sets of parameter values, wherein each parameter value in a set is a value associated with one of the parameter definitions;

means for establishing a plurality of target data sets, wherein each target data set is respectively associated with one of the sets of parameter values, and each target data set includes at least one data value that describes a performance characteristic of the computing arrangement;

means for associating the sets of parameter values with a test program;

means for executing the test program using one set of parameter values at a time, inputting to the test program a parameter value associated with a static parameter, automatically generating a value for each dynamic parameter, and exercising the computing arrangement using the parameter values in a set, wherein the value of each parameter affects behavior of the computing arrangement via the test program;

means for storing data resulting from execution of the test program in portions of the results storage area respectively associated with the sets of parameter values; and means for selectively adjusting, for each set of parameter values having an associated target data set, at least one parameter value in the set of parameter values as a function of data resulting from execution of the test program and a value from the associated target data set, continuing exercising the computing arrangement using the set of parameter values and adjusting the at least one parameter values until data resulting from execution of the test program meets selected criteria relative to the associated target data set, and saving the set of parameter values when data resulting from execution of the test program meets the selected criteria.

* * * * *